Patented May 9, 1950

2,506,904

UNITED STATES PATENT OFFICE 2,506,904

SYNTHETIC WAX

Herschel G. Smith, Wallingford, and Troy L. Cantrell, Lansdowne, Pa., assignors to Gulf Oil Corporation, Pittsburgh, Pa., a corporation of Pennsylvania No Drawing. Application August 16, 1948, Serial No. 44,578

17 Claims. (Cl. 260—407)

This invention relates to synthetic waxes, and more particularly to condensation products of formaldehyde and higher fatty acid esters of mono-alkylated phenols. The synthetic waxes of this invention are particularly adapted for use in greases, polishing compositions and mineral lubricating oils.

It is an object of this invention to provide compositions of matter having waxy characteristics at ordinary room temperatures, good stability, and substantial solubility in oils, particularly mineral lubricating oils.

It is a further object of this invention to provide an improved and simple method for obtaining such waxy compositions.

These and other objects are attained by the present invention wherein we provide substantially neutral condensation products of formaldehyde and higher fatty monocarboxylic acid esters of a mono-alkylated phenol, the higher fatty acid being a saturated or mono-olefinic fatty acid having at least 8 carbon atoms, and the alkyl substituent of the mono-alkylated phenol having from 4 to 12 carbon atoms. The products so obtained have many of the characteristics of natural waxes and thus provide a cheap substitute for such natural waxes. They are soluble in mineral lubricating oils and are of particular utility in stabilizing mineral oil lubricating greases to prevent "bleeding" of the mineral oil and to retain the structure of the greases.

As has been stated, the alkyl substituent of the mono-alkylated phenols employed in preparing our synthetic waxes have from 4 to 12 carbon atoms. A preferred group of the mono-alkylated phenols are those prepared by alkylating phenol with an olefin having from 4 to 12 carbon atoms in the presence of a concentrated sulfuric acid catalyst, preferably in accordance with the disclosure of U. S. Patent 2,149,759 to Cantrell. According to said patent, phenol is mixed with from 1 to 10 per cent of sulfuric acid having a strength of 60 to 100 per cent, or even fuming sulfuric acid, and an olefin or a mixture of olefins (as present in refinery gas, for example) is passed through the liquid mixture. The reaction temperature is controlled so as not to exceed 220° F. The alkylated phenol or mixtures of alkylated phenols so obtained may then be washed with water and dilute caustic soda solution to remove the sulfuric acid catalyst. However, it is a feature of our invention that the sulfuric acid need not be removed, but that the resulting impure alkylated product may be directly subjected to esterification with a higher fatty acid and the esterified product still containing the acid to condensation with formaldehyde, as will be more fully described hereinbelow.

Representative olefins or olefin-containing materials which may be employed for the alkylation of phenol are butene-1, isobutylene, the amylenes, refinery gas, diisobutylene and triisobutylene. The use of diisobutylene is preferred since the alkylated phenol obtained is primarily para-(alpha, alpha, gamma, gamma) tetramethylbutyl phenol, which is particularly useful in our invention.

It should be understood that our invention is not limited to the secondary or tertiary mono-alkylated phenols obtained by alkylating phenol with an olefin having from 4 to 12 carbon atoms. Thus the n-alkyl phenols having from 4 to 12 carbon atoms in the alkyl substituent, prepared for example by alkylating phenol with an n-alkyl halide in the presence of a Friedel-Crafts catalyst such as aluminum chloride, may also be employed. Our invention therefore contemplates the use of any mono-alkylated phenol having from 4 to 12 carbon atoms in the alkyl substituent.

Included among the mono-alkylated phenols which are useful in our invention are n-butyl phenol, sec-butyl phenol, tert-butyl phenol, n-amyl phenol, sec-amyl phenol, tert-amyl phenol, n-hexyl phenol, n-octyl phenol, (alpha, alpha, gamma, gamma) tetramethylbutyl phenol, triisobutyl phenol and mixtures thereof.

The use of alkylated phenols having an alkyl substituent of less than 4 carbon atoms is not satisfactory because the resulting esterified condensation products prepared from such phenols are not sufficiently soluble in mineral lubricating oils and mineral oil lubricant compositions to serve the functions of an efficient additive. Similarly, if the alkyl substituent of the alkylated phenol exceeds 12 carbon atoms, the resulting esterified condensation products tend to be unstable and to become insoluble in mineral oils.

In accordance with our invention, the above-described mono-alkylated phenol is esterified with a higher fatty monocarboxylic saturated or mono-olefinic acid containing at least 8 carbon atoms. The fatty acid is employed in equimolar amounts with the alkylated phenol. In general, the esterification reaction is conducted at a temperature not in excess of 220° F. Conventional esterification catalysts, such as sulfuric acid and p-toluene sulfonic acid, may be employed; but when the mono-alkylated phenol is prepared by alkylating a phenol with an olefin in the presence of a sulfuric acid catalyst, as described hereinabove, the resulting mono-alkylated phenol still containing the sulfuric acid alkylation catalyst may be used directly in the esterification without adding any further esterification catalyst.

Suitable fatty monocarboxylic acids having at least 8 carbon atoms are the saturated and the mono-olefinic fatty acids. A preferred group of fatty acids are the fatty acids of from 8 to 32 carbon atoms. The saturated fatty acids include caprylic, pelargonic, capric, undecylic, lauric, myristic, palmitic, stearic, arachidic, behenic, arnaubic, cerotic, melissic and psyllaic acids. The mono-olefinic fatty acids include nonylenic, decylenic, undecylenic, oleic, ricinoleic, erucic and brassidic acids. Mixtures of fatty acids having at least 8 carbon atoms, as obtained from the saponification of fats and fatty oils for example, may also be employed. Naphthenic acids and Hydrofol acids (hydrogenated fish oil fatty acids) are also suitable saturated fatty acids.

When the fatty acid has less than 8 carbon atoms, the condensation products of formaldehyde and the fatty acid esters of the mono-alkylated phenol tend to become hard and brittle and of poor solubility in mineral oils. These effects increase as the length of the fatty acid chain decreases. Accordingly, the fatty acid must have at least 8 carbon atoms.

The esterified mono-alkylated phenol is then condensed with formaldehyde to yield the waxy condensation products of our invention. The condensation reaction takes place at a mildly elevated temperature of about 210° F. by refluxing the reactants until all of the formaldehyde is consumed. The mol ratio of alkylated phenol ester to formaldehyde varies from 1:1 to 1:2. Either acid or alkaline condensing agents may be employed, but it is preferred to employ the acid which is retained in the impure esterified alkylated phenol, when an impure alkylated phenol containing the acid used in its preparation from an olefin and phenol is used in the preparation of the ester. It may be seen, therefore, that a preferred embodiment of preparing our waxy condensation products comprises employing the same sulfuric acid, used as a catalyst in preparing the mono-alkylated phenol, for both the subsequent esterification and condensation reactions. The condensation product of the mono-alkylated phenol ester and formaldehyde is then dehydrated in the usual manner.

The following examples are illustrative of our invention.

*Example I*

Into a suitable reaction vessel equipped with a stirrer and means for heating and cooling, there were charged 112 pounds (1 pound mol) of octylene (commercial diisobutylene) and 94 pounds (1 pound mol) of phenol. Agitation was begun and 10 pounds of 96% sulfuric acid were gradually added. The temperature of the reaction was so controlled that it did not exceed 220° F. The resulting product was primarily para-(alpha, alpha, gamma, gamma) tetramethylbutyl phenol.

One pound mol of the octyl phenol prepared as described hereinabove and still containing the sulfuric acid catalyst, and 1 pound mol of lauric acid were charged into a suitable closed reaction vessel equipped with a stirrer, a reflux condenser and means for heating and cooling. Agitation was begun and the charge heated while controlling the temperature so that it did not exceed 220° F. Upon completion of the esterification reaction, 1 pound mol of formaldehyde (in a 37% by weight aqueous solution) was added and the mixture refluxed at a temperature of 205–210° F. for two hours. The charge was then transferred to an open reaction vessel and the temperature increased to 500° F. to complete the reaction and dehydrate the product. The resulting dehydrated product had the following properties:

Penetration, ASTM D5–25:
   77° F., 100 grams, 5 sec_____ 60
Penetration, ASTM D217–44T:
   77° F., 150 grams, 5 sec., unworked_____ 43
Neutralization No_____ 12.2

*Example II*

Example I was repeated except that oleic acid was used instead of lauric acid, and 2 pound mols of formaldehyde were used instead of 1 pound mol. The dehydrated product had the following properties:

Penetration, ASTM D5–25:
   77° F., 100 grams, 5 sec_____ Too soft
Penetration, ASTM D217–44T:
   77° F., 150 grams, 5 sec., unworked_____ 360
Neutralization No _____ 12.8

*Example III*

Example I was repeated except that naphthenic acids were used instead of lauric acid, and 2 pound mols of formaldehyde were used instead of 1 pound mol. The dehydrated product had the following properties:

Penetration, ASTM D5–25:
   77° F., 100 grams, 5 sec_____ 46
Penetration, ASTM D217–44T:
   77° F., 150 grams, 5 sec., unworked_____ 44
Neutralization No _____ 5.37

The naphthenic acids used in the above example were derived by extraction from petroleum. The acids had the following properties:

Gravity, °API_____ 14.0
Viscosity, SUV:
   100° F_____ 749
Flash, OC, °F_____ 260
Pour, °F_____ 0
Color, NPA_____ 4.75 dilute
Sulfur, B, percent_____ 0.20
Water by distillation, percent by weight___ 0.6
Neutralization No _____ 205.2
Ash, percent_____ 0.03
Distillation, gas oil:
   ASTM D158–41—
     Over point, °F_____ 363
     10% at, °F_____ 568
     50 _____ 626
     90 _____ 690

It should be understood that the above examples are intended to be illustrative only and that any of the mono-alkylated phenols and fatty acids disclosed herein may be employed in lieu of the (alpha, alpha, gamma, gamma) tetramethylbutyl phenol and the specific fatty acids employed in the examples.

The condensation products of our invention are useful in polishing compositions and especially as additives in the manufacture of compounded mineral oil lubricant compositions. When added in small amounts, say from 0.1 to 1.0 per cent by weight, to a turbine oil, rusting of metal parts lubricated by said turbine oil is substantially inhibited. When added in small amounts, from 0.1 to 5.0 per cent by weight, to a grease, the condensation products of our invention have the surprising functions of improving the resistance of the grease to oxidation and water solvency, and of stabilizing the grease against oil separation ("bleeding") and structural breakdown at increased temperatures. The use of our new condensation products in greases is described and claimed in our continuation-in-part application Serial No. 94,252, filed May 19, 1949.

Resort may be had to such modifications and variations as fall within the spirit of the invention and the scope of the appended claims.

We claim:

1. A composition of waxy character comprising a substantially neutral condensation product of formaldehyde and a higher fatty monocarboxylic acid ester of a mono-alkylated phenol, the higher fatty acid being selected from the class consisting of saturated and mono-olefinic fatty acids having at least 8 carbon atoms, and the alkyl substituent of the alkylated phenol having from 4 to 12 carbon atoms.

2. The composition of claim 1, wherein the higher fatty acid is a saturated fatty acid.

3. The composition of claim 1, wherein the higher fatty acid is a mono-olefinic fatty acid.

4. A composition of waxy character comprising a substantially neutral condensation product of formaldehyde and a higher fatty monocarboxylic acid ester of a mono-alkylated phenol, the higher fatty acid being selected from the class consisting of saturated and mono-olefinic fatty acids having from 8 to 32 carbon atoms, and the alkyl substituent of the alkylated phenol having from 4 to 12 carbon atoms; the mol ratio of alkylated phenol ester to formaldehyde in the condensation product varying from 1:1 to 1:2.

5. A composition of waxy character comprising a substantially neutral condensation product of formaldehyde and a higher fatty monocarboxylic acid ester of a mono-alkylated phenol, the higher fatty acid being selected from the class consisting of saturated and mono-olefinic fatty acids having from 8 to 32 carbon atoms, and the alkylated phenol being (alpha, alpha, gamma, gamma) tetramethylbutyl phenol.

6. A composition of waxy character comprising a substantially neutral condensation product of formaldehyde and the lauric acid ester of (alpha, alpha, gamma, gamma) tetramethylbutyl phenol.

7. A composition of waxy character comprising a substantially neutral condensation product of formaldehyde and the oleic acid ester of (alpha, alpha, gamma, gamma) tetramethylbutyl phenol.

8. A composition of waxy character comprising a substantially neutral condensation product of formaldehyde and the naphthenic acid ester of (alpha, alpha, gamma, gamma) tetramethylbutyl phenol.

9. The process which comprises esterifying a mono-alkylated phenol having from 4 to 12 carbon atoms in the alkyl substituent with a higher fatty monocarboxylic acid selected from the class consisting of saturated and mono-olefinic fatty acids having at least 8 carbon atoms to form a substantially neutral ester, and condensing said ester with formaldehyde to obtain a substantially neutral waxy product.

10. The process of claim 9, wherein the higher fatty acid is a saturated fatty acid.

11. The process of claim 9, wherein the higher fatty acid is a mono-olefinic fatty acid.

12. The process which comprises mono-alkylating phenol with an olefinic hydrocarbon of from 4 to 12 carbon atoms in the presence of a catalytic amount of sulfuric acid, esterifying the crude alkylated product containing said sulfuric acid with a higher fatty monocarboxylic acid selected from the class consisting of saturated and mono-olefinic fatty acids having at least 8 carbon atoms, and condensing the crude ester containing said sulfuric acid with formaldehyde to obtain a substantially neutral waxy product.

13. The process which comprises esterifying 1 mol of a mono-alkylated phenol having from 4 to 12 carbon atoms in the alkyl substituent with 1 mol of a higher fatty monocarboxylic acid selected from the class consisting of saturated and mono-olefinic fatty acids having from 8 to 32 carbon atoms at a temperature not exceeding 220° F., condensing said ester with from 1 to 2 mols of formaldehyde at a mildly elevated temperature, and dehydrating the condensation product.

14. The process which comprises esterifying 1 mol of (alpha, alpha, gamma, gamma) tetramethylbutyl phenol with 1 mol of a higher fatty monocarboxylic acid selected from the class consisting of saturated and mono-olefinic fatty acids having from 8 to 32 carbon atoms at a temperature not exceeding 220° F., and condensing said ester with from 1 to 2 mols of formaldehyde at a mildly elevated temperature to obtain a substantially neutral waxy product.

15. The process of claim 14, wherein the fatty acid is lauric acid, and 1 mol of formaldehyde is employed.

16. The process of claim 14, wherein the fatty acid is oleic acid, and 2 mols of formaldehyde are employed.

17. The process of claim 14, wherein the fatty acid is naphthenic acid, and 2 mols of formaldehyde are employed.

HERSCHEL G. SMITH.
TROY L. CANTRELL.

REFERENCES CITED

The following references are of record in the file of this patent:

UNITED STATES PATENTS

| Number | Name | Date |
|---|---|---|
| 2,058,797 | Honel | Oct. 27, 1936 |
| 2,165,380 | Honel | July 11, 1939 |